No. 754,738. PATENTED MAR. 15, 1904.
H. R. BEVIER.
VARIABLE SPEED AND REVERSING GEAR.
APPLICATION FILED JUNE 16, 1903.
NO MODEL.
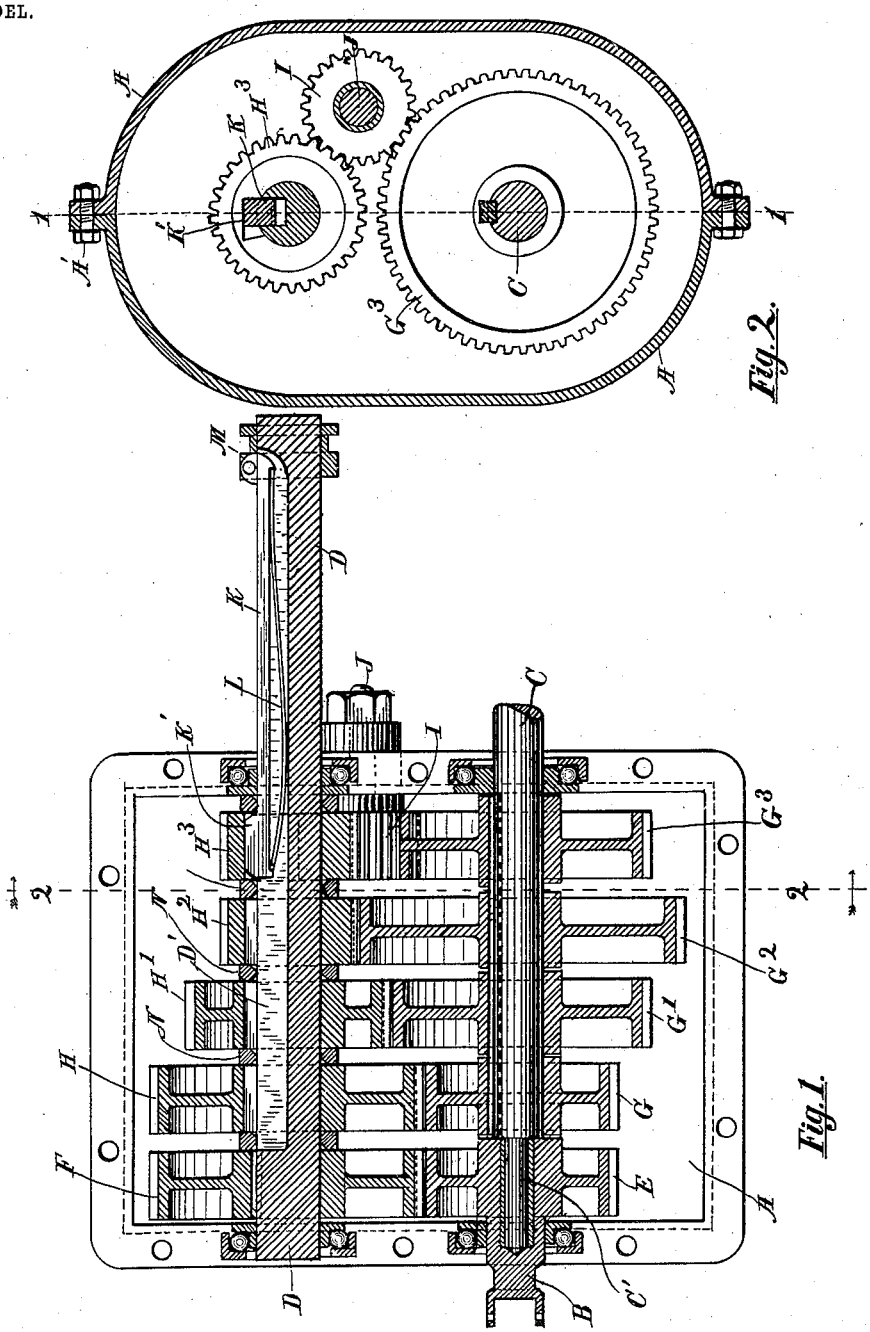
Witnesses
George Holloway
Georgeana Chace
Inventor
Henry R. Bevier
By Luther V. Moulton
Attorney No. 754,738. Patented March 15, 1904.

UNITED STATES PATENT OFFICE.

HENRY R. BEVIER, OF GRAND RAPIDS, MICHIGAN.

VARIABLE-SPEED AND REVERSING GEAR.

SPECIFICATION forming part of Letters Patent No. 754,738, dated March 15, 1904.

Application filed June 16, 1903. Serial No. 161,754. (No model.)

*To all whom it may concern:*

Be it known that I, HENRY R. BEVIER, a citizen of the United States, residing at Grand Rapids, in the county of Kent and State of Michigan, have invented certain new and useful Improvements in Variable-Speed and Reversing Gear; and I do hereby declare the following to be a full, clear, and exact description of the invention, such as will enable others skilled in the art to which it appertains to make and use the same.

My invention relates to gearing adapted to vary the speed and reverse the action of any driven device, and is particularly adapted for use in automobiles.

The object of my device is to provide a simple, durable, and compact device which may be operated by means of a single lever connected thereto and having certain new and useful features hereinafter more fully described, and particularly pointed out in the claims.

My device consists, essentially, of a driving member having a gear fixed thereon, a counter-shaft having a fixed gear engaging the driving-gear, a series of loose gears on the counter-shaft, a shiftable key to severally engage and drive one at a time of said gears, and a driven shaft having a series of gears corresponding to the loose gears on the counter-shaft and fixed on the driven shaft, all of the gears fixed on the driven shaft being directly engaged with corresponding loose gears on the counter-shaft except one, which latter is engaged by an idler driven by one of said loose gears, whereby the motion of the driven shaft is reversed, as will more fully appear by reference to the accompanying drawings, in which—

Figure 1 is a horizontal section of a device embodying my invention and taken on the line 1 1 of Fig. 2; and Fig. 2, a vertical section of the same, taken on the line 2 2 of Fig. 1.

Like letters refer to like parts in both of the figures.

A represents a suitable case to inclose the gearing and in which the described shafts are mounted in suitable bearings, said case being divided in the plane of the axis of the bearings and its parts detachably secured by suitable bolts, as at A'.

B is a driving member having one end outside the case, to which end any suitable motor may be attached, and fixed on the inner end of this member is the driving-gear E.

C is the driven shaft, preferably arranged in alinement with the driving member B and having a reduced end C' journaled in the said member, whereby the driving member B and shaft C are independently rotative and supported in alined bearings in the case.

On the driven shaft C is fixed a series of any convenient number of gears of different sizes, as at G, G', G², and G³.

D is the counter-shaft, journaled in suitable bearings in the case and projecting outside the same at one end and arranged parallel with the shaft C. On this counter-shaft D is a fixed gear F, engaging the driving-gear E, whereby the counter-shaft is rotated by the member B at a certain uniform rate, and on this shaft D is a series of gears H, H', and H², rotative on the shaft and engaging corresponding gears on the driven shaft C. The respective pairs of gears on these respective shafts are proportioned to provide for such various speeds as occasion may require, and any desired number of the same may be provided by varying the proportions of case and shafts.

The gear H³ does not engage directly with the corresponding gear G³, but drives the same through an idler-gear I, mounted on a stud J, projecting within the case, whereby the direction of rotation of the shaft C is reversed when these gears are in operation. To connect any one of the loose gears on the shaft D with the same, and thus operate the driven shaft C thereby, the shaft D is provided with a longitudinal channel or keyway D', in which is a sliding key K, having a portion K', adapted to project outward from the shaft and engage a suitable key-seat in each of the gears on the said shaft. This key and the shaft are prolonged outside the case, and on the outer end of the shaft is mounted a sliding collar M, to which collar the key K is pivotally attached, whereby the key is shifted in the keyway D' to engage any of the gears. This collar may be adjusted on the shaft and held by any suitable means. (Not shown.) The key K is yieldingly held in engagement with the respective gears by a spring L beneath the key, and to prevent engagement of the key with more than one gear at a time the gears on the shaft D are separated by loose collars N, and the outwardly-projecting portion K' of the key is provided with inclined ends, whereby these inclines engage the inner surfaces of the collars and depress the key as it is passing from one gear to another.

In the drawings the key is shown engaged with the gear $H^3$, which engages the idler I, and thus through the idler and the gear $G^3$ rotates the shaft C backward or in the opposite direction from any of the other pairs of gears. By shifting the key to engagement with any one of the gears H, H', or $H^2$ three different forward speeds of the shaft C will result.

Having thus fully described my invention, what I claim, and desire to secure by Letters Patent, is—

1. The combination of a driving member, a gear fixed on the same, a counter-shaft, a gear fixed on the counter-shaft and engaging the driving-gear, a series of loose gears on the counter-shaft, a driven shaft, a series of fixed gears on the same and engaging the said loose gears, a loose gear on the counter-shaft, a fixed gear on the driven shaft, an idler-gear connecting the last-named gears, a shifting key in the counter-shaft, and means for shifting the key.

2. The combination of a driving member, a driving-gear fixed thereon, a counter-shaft having a keyway, a gear fixed on the counter-shaft, and engaging the driving-gear, a series of loose gears on the counter-shaft, loose collars between said gears, a key slidable in the keyway, and having a projection with inclined ends, a spring engaging the key, a sliding collar pivotally connected to the key, a series of gears fixed on the driven shaft and engaging the gears on the counter-shaft, a loose gear on the counter-shaft, an idler-gear engaged by said loose gear and a fixed gear on the driven shaft engaged by the idler.

3. The combination of a case, a driving member journaled in the case and having an internal bearing, a driving-gear fixed on the said member, a counter-shaft journaled in the case and having a keyway, a gear fixed on the counter-shaft and engaging the driving-gear, a driven shaft journaled in the case, and having one end journaled in the bearing in the driving member, a series of loose gears on the counter-shaft, fixed gears on the driven shaft and arranged in intermeshing pairs, with the loose gears, a loose gear on the counter-shaft, an idler engaged by said gear, a fixed gear on the driven shaft and engaging the idler, a shifting key in the keyway, and having inclines to engage the collars, a spring engaging the key, a sliding collar on the counter-shaft and connected to the key, and collars on the counter-shaft and between the gears.

In testimony whereof I affix my signature in presence of two witnesses.

HENRY R. BEVIER.

Witnesses:
   LUTHER V. MOULTON,
   GEORGIANA CHACE.